United States Patent

Nickel

[11] 3,995,995
[45] Dec. 7, 1976

[54] PROCESS FOR DYEING FIBRES CONTAINING AMIDE GROUPS

[75] Inventor: Horst Nickel, Leverkusen, Germany

[73] Assignee: Bayer Aktiengesellschaft, Leverkusen, Germany

[22] Filed: July 23, 1975

[21] Appl. No.: 598,267

[30] Foreign Application Priority Data

July 31, 1974 Germany .......................... 2436899

[52] U.S. Cl. ................................ 8/41 B; 8/178 R; 260/196
[51] Int. Cl.² ................... D06P 1/02; C07C 107/08
[58] Field of Search ....................... 8/41 B; 260/196

[56] References Cited

UNITED STATES PATENTS 3,494,911  2/1970  de Montmollin ................. 260/196
3,755,290  8/1973  de Montmollin ................. 260/196

FOREIGN PATENTS OR APPLICATIONS 1,150,978  5/1969  United Kingdom

*Primary Examiner*—Joseph L. Schofer
*Assistant Examiner*—A. L. Clingman
*Attorney, Agent, or Firm*—Plumley and Tyner

[57] ABSTRACT

The dyestuff of the formula

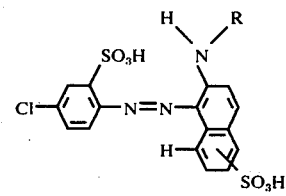

in which

R represents hydrogen or $C_1$–$C_4$-alkyl, is suitable for the dyeing of amide groups containing fibres.

2 Claims, No Drawings

PROCESS FOR DYEING FIBRES CONTAINING AMIDE GROUPS

The subject of the invention is a process for dyeing fibres containing amide groups, characterised in that monoazo dyestuffs which in the form of the free acid correspond to the general formula

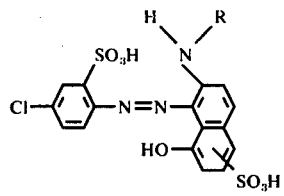

wherein
R represents hydrogen or $C_1$–$C_4$-alkyl
are used.

The alkyl radical can be, for example, methyl.

Such dyestuffs are prepared according to customary processes by diazotisation of 4-chloroaniline-2-sulphonic acid and coupling the resulting diazonium salt with 2-amino-8-hydroxy-naphthalenesulphonic acids in the 1-position of the naphthalene nucleus.

The dyestuff in which R denotes hydrogen and the sulpho group is in the 6-position of the naphthalene nucleus is particularly suitable.

Customary dyeing processes can be used for dyeing polyamide materials. The dyestuff can be introduced into the dyeing liquor as a dyestuff powder or, particularly advantageously, as a concentrated dyestuff solution.

Dyestuff solutions are obtained, for example by dissolving the dyestuff-acid and/or the dyestuff salts in water and/or organic solvents such as formamide, dimethylformamide, ethylene glycol, diethylene glycol, ethylene glycol monomethyl ether or monoethyl ether or diethylene glycol monomethyl ether, monoethyl ether, monopropyl ether or monoisopropyl ether, if appropriate with addition of auxiliaries such as urea, thiourea or dispersing agents.

If dyestuff salts are used, examples of suitable cations are lithium, sodium, potassium, ammonium and optionally substituted amines such as alkanolamines, for example monoethanolamine, diethanolamine, triethanolamine, monoisopropanolamine or diisopropanolamine or tris-[($\beta$-hydroxyethoxy)-ethyl]amine.

The dyestuffs are outstandingly suitable for dyeing fibres containing amide groups, such as wool, polymides and high molecular weight polyamides, in particular also polyamides of differing dyeability, such as are employed in so-called "differential dyeing". The dyestuffs have excellent fastness to light, good migration capacity, build-up capacity and affinity and good fastness to wet processing. The differentiation of different polyamide materials is to be regarded as very good. The dyeing with the dyestuffs according to the invention is carried out from neutral aqueous dye baths or from aqueous dye baths which are slightly acid as a result of the addition of acids customarily used, such as formic acid, acetic acid or sulphuric acid, and which optionally contain customary dyeing auxiliaries.

Compared to the dyestuff C.I. Acid Red 37.17,045 known from the literature, the dyestuffs according to the present application have advantages in build-up capacity, in neutral affinity and in their behaviour in combinations.

EXAMPLE 1

0.1 g of the dyestuff of the formula

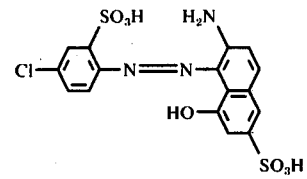

are dissolved in 100 ml of hot water. 5 ml of 10% strength ammonium acetate solution are added and the mixture is diluted with water to a volume of 500 ml. 10 g of polyamide fibres are introduced into the dye bath, the latter is brought to the boil over the course of 20 minutes, 4 ml of 10% strength acetic acid are added and the bath is boiled for one hour. The fibers are then rinsed and dried at 70°–80° C. A red dyeing is obtained.

If, in the above dyeing process, the 6-sulphonic acid dyestuff is replaced by the corresponding 5-sulphonic acid dyestuff, a red dyeing is again obtained.

With dyestuffs which contain 2-(N-methylamino)-8-hydroxynaphthalene-5-sulphinic acid or -6-sulphonic acid as the coupling component, strongly bluish-tinged red dyeings are obtained.

I claim:
1. Process for dyeing fibres containing amide groups, characterised in that a monoazo dyestuff which in the form of the free acid corresponds to the formula

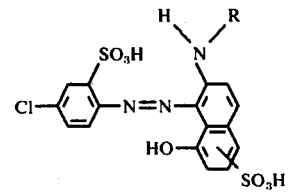

wherein
R represents hydrogen or $C_1$-$C_4$-alkyl
is used.

2. Fibres, containing amide groups, dyed in accordance with the process of claim 1.

* * * * *